United States Patent
Han et al.

(10) Patent No.: US 7,459,815 B2
(45) Date of Patent: Dec. 2, 2008

(54) INDUCTION MOTOR HAVING REVERSE-ROTATION PREVENTING FUNCTION

(75) Inventors: Seung-Do Han, Incheon (KR);
Hyoun-Jeong Shin, Incheon (KR);
Jae-Hong Ahn, Gyeonggi-Do (KR);
Seung-Suk Oh, Gyeonggi-Do (KR);
Dong-Il Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 497 days.

(21) Appl. No.: 11/340,627

(22) Filed: Jan. 27, 2006

(65) Prior Publication Data

US 2006/0175924 A1    Aug. 10, 2006

(30) Foreign Application Priority Data

Feb. 4, 2005    (KR) .................. 10-2005-0010792

(51) Int. Cl.
*H02K 7/10*    (2006.01)
*H02K 17/30*    (2006.01)
*H02K 16/02*    (2006.01)
*H02K 17/16*    (2006.01)

(52) U.S. Cl. .............. 310/77; 310/114; 310/156.78; 310/166; 310/211; 318/727

(58) Field of Classification Search ............. 310/77, 310/68 R, 68 B, 41, 114, 156.78, 156.81, 310/166, 167, 211; 318/727; 361/23
See application file for complete search history.

(56) References Cited

U.S. PATENT DOCUMENTS 3,032,667 A * 5/1962 Sorchy .................. 310/77
3,501,656 A * 3/1970 Morley ................... 310/41
3,502,918 A * 3/1970 Casey et al. ............. 310/77

(Continued)

FOREIGN PATENT DOCUMENTS

DE    1199390    8/1965

(Continued)

OTHER PUBLICATIONS

English Language Abstract of EP 0 136 282.

*Primary Examiner*—Burton Mullins
(74) *Attorney, Agent, or Firm*—Greenblum & Bernstein, P.L.C.

(57) ABSTRACT

An induction motor having a reverse-rotation preventing function, comprises: a stator provided with a winding coil generating flux by a current; an induction rotor provided with a cage and rotatably inserted in the stator, wherein a rotary shaft is coupled to its inside; a synchronous rotor provided with a permanent magnet and rotatably coupled between the stator and the induction rotor; an induction-force generating unit generating a force for moving the synchronous rotor in an axial direction; and a rotation preventing unit preventing a reverse rotation by fixing the synchronous rotor moved by the induction-force generating unit at the time of reverse rotation of the synchronous rotor. When a reverse rotation of the induction motor occurs as a reverse-rotation force is applied to the induction rotor due to a phase of a voltage which is initially applied and an unparallel rotating magnetic field at the time of initial driving of the motor, the load inertia of the synchronous rotor is increased, and the reverse rotation of the synchronous rotor and the induction rotor is prevented. Also, the construction for preventing the reverse rotation of the motor is simplified, and a small number of components are required.

20 Claims, 8 Drawing Sheets

U.S. PATENT DOCUMENTS

| | | | |
|---|---|---|---|
| 3,821,567 A | * | 6/1974 | Erwin .......................... 310/41 |
| 4,381,048 A | * | 4/1983 | Haverkamp et al. ......... 188/171 |
| 4,651,040 A | * | 3/1987 | Gerstner et al. ............. 310/166 |
| 4,720,647 A | * | 1/1988 | Plumer ........................ 310/77 |
| 5,177,143 A | * | 1/1993 | Chang et al. ................ 524/848 |
| 2004/0174083 A1 | | 9/2004 | Han et al. |

FOREIGN PATENT DOCUMENTS

EP          0136282      4/1985

\* cited by examiner

INDUCTION MOTOR HAVING REVERSE-ROTATION PREVENTING FUNCTION

BACKGROUND OF THE INVENTION

1. Field of the Invention

The present invention relates to an induction motor, and particularly, to an induction motor having a reverse-rotation preventing function configured not only to prevent a reverse rotation of a synchronous rotor and an induction rotor at the time of initial driving but also to simplify a structure and lower a manufacturing cost.

2. Description of the Background Art

In general, a motor is for converting electric energy into kinetic energy, and is being used as a power source of various products such as home appliances. For example, in the case of a refrigerator, a motor rotates a fan to circulate the cool air within the refrigerator, and in the case an air-conditioner, the motor rotates a fan to let the cool air, which is formed by an evaporator, flow into a room. Also, there are various types of motors according to their fields of application.

An induction motor, one of the various motors, includes a stator forming a rotating magnetic field and an induction rotor rotatably inserted in the stator. In these days, an induction motor having a permanent magnet between the stator and the inductor rotor is being developed for the purpose of improving efficiency of the induction motor.

FIG. 1 is a front view that illustrates one example of an induction motor on which a present applicant is conducting research and development, and FIG. 2 is a sectional view of an induction rotor constituting the induction motor.

As shown, the induction motor includes a stator 100 provided with a winding coil, an induction rotor 200 rotatably inserted in the stator 100, and a synchronous rotor 300 rotatably inserted between the stator 100 and the induction rotor 200.

The stator 100 includes a stator core 110 formed to have a certain length, and a winding coil wound around a plurality of teeth 111 formed in the stator core 110 and forming a rotating magnetic field. The stator core 110 is a lamination body formed by lamination of plurality of sheets.

The induction rotor 200 includes a rotor core 210 having a cylindrical bar shape with a certain length and outer diameter and a cage 220 inserted in the rotor core 210. A rotary shaft 230 is coupled to the center of the rotor core 210. The rotor core 210 is a lamination body formed by lamination of a plurality of sheets. The case 220 includes annular ending ring portions 221 respectively placed at both sides of the rotor core 210 and a plurality connection bar portions 222 placed inside the rotor core 210 and connecting the two end portions 221. The plurality of connection bar portions 222 are arranged at a regular interval and parallel to the central line of the end ring portion 221. The cage 220 is a conductor and is formed at the rotor core 210 by insert-molding.

The induction rotor 200 is inserted into an insertion hole of the stator 100.

The synchronous rotor 300 includes a permanent magnet 310 formed in a hollow cylindrical type with a certain thickness, and a holder 320 formed as a cup shape and supporting the permanent magnet 310. The permanent magnet 310 is rotatably inserted into an air gap between the stator 100 and the induction rotor 200, a bearing 330 is coupled to one side of the holder 320 and is also coupled to the rotary shaft 230.

The stator 100 is mounted in a motor casing 400, bearings 410 are provided at both sides of the motor casing 400, respectively, and the rotary shaft 230 is coupled to the bearings 410.

The induction motor sends a rotary force to a load through the rotary shaft 230, and in the drawing, a fan 240 is mounted to the rotary shaft 230.

The operation of the induction motor will now be described.

Power is applied to the stator 100, a rotating magnetic force is formed by power applied to the stator 100, and the synchronous rotor 300 provided with the permanent magnet 310 makes a relative rotation with respect to the rotary shaft 230, corresponding to the rotating magnetic force. Then, simultaneously with the rotation of the synchronous rotor 300, an induction current flows to the case 220 of the induction rotor 200 by flux of the permanent magnet constituting the synchronous rotor 400. Thusly, the induction rotor 200 is rotated under the influence of the rotating magnetic field of the stator 100, the permanent magnet 310 of the synchronous rotor 300 and the induction current induced to the induction rotor 200.

According to a circuit construction, the induction rotor 200 of the induction motor is rotated at up to a synchronous speed by the permanent magnet 310 of the synchronous rotor 300 and a current flowing through a sub-winding coil constituting the winding coil 120 at the time of initial driving, and then is rotated by a current flowing through a main winding coil constituting the winding coil 120.

However, such an induction motor has disadvantages in that the synchronous rotor 300 and the induction rotor 200 make a reverse rotation under the influence of a voltage phase and unparallel rotating magnetic field at the time of initial power supply. The synchronous rotor 300 and the induction rotor 200 have a tendency to increasingly rotate in a reverse direction as load inertia gets smaller and a voltage gets greater.

As one of methods for preventing the reverse rotation of the synchronous rotor 300 and the induction rotor 200 of the induction motor, a reverse-rotation preventing circuit is provided to the induction motor to prevent a reverse rotation of the synchronous rotor 300 and the induction rotor 200. However, this method is problematic in that the construction of the reverse-rotation preventing circuit is complicated and the manufacturing cost is expensive.

SUMMARY OF THE INVENTION

Therefore, an object of the present invention is to provide an induction motor having a reverse-rotation preventing function configured not only to prevent a reverse rotation of a synchronous rotor and an induction rotor at the time of initial driving but also to simplify a structure and lower a manufacturing cost.

To achieve these and other advantages and in accordance with the purpose of the present invention, as embodied and broadly described herein, there is provided an induction motor having a reverse-rotation preventing function, comprising: a stator provided with a winding coil generating flux by a current; an induction rotor provided with a cage and rotatably inserted in the stator, wherein a rotary shaft is coupled to its inside; a synchronous rotor provided with a permanent magnet and rotatably coupled between the stator and the induction rotor; an induction-force generating unit generating a force for moving the synchronous rotor in an axial direction; and a rotation preventing unit preventing a reverse rotation by fixing the synchronous rotor moved by the induction-force generating unit at the time of reverse rotation of the synchronous rotor.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
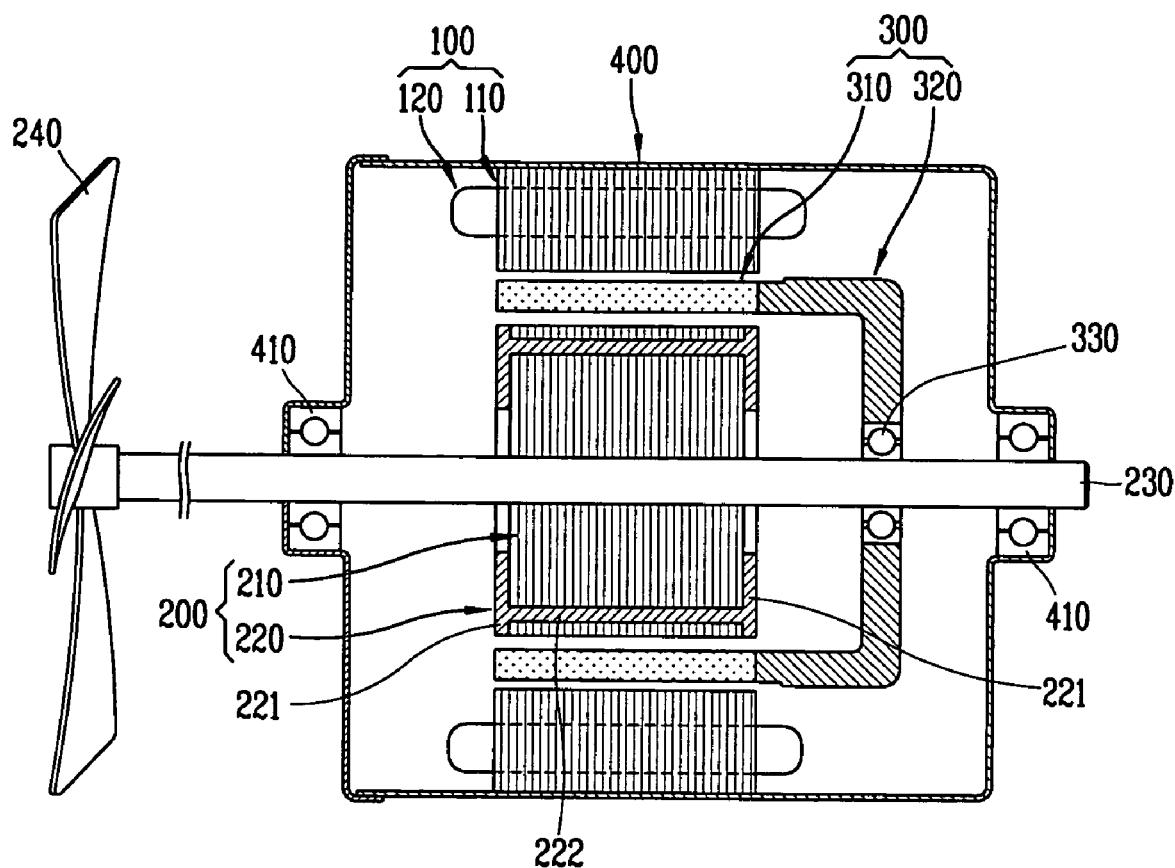
FIGS. 1 and 2 are front and side sectional views that illustrate an induction motor on which a present applicant is conducting research and development, respectively.
Figure 2:
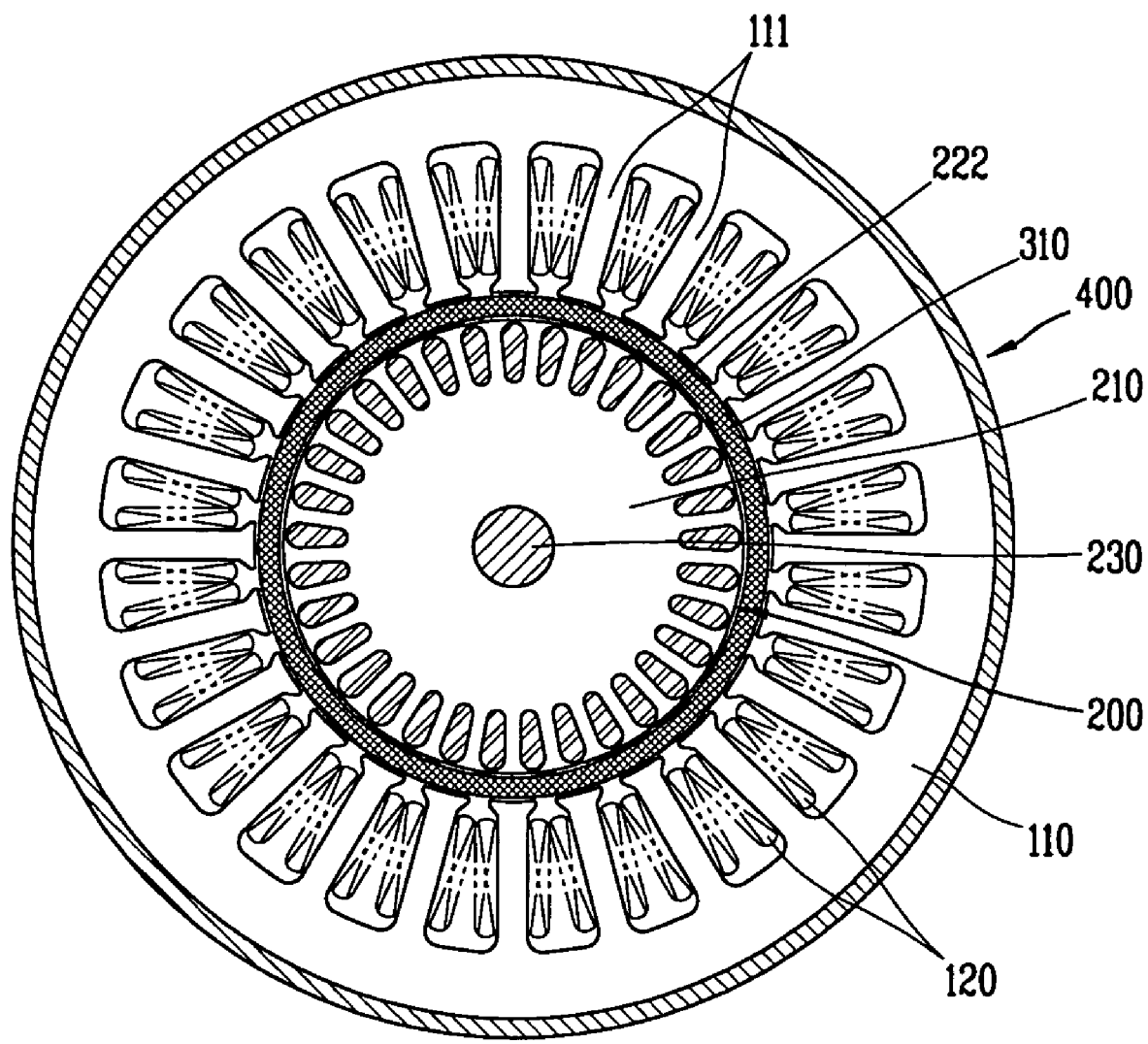
Figure 3:
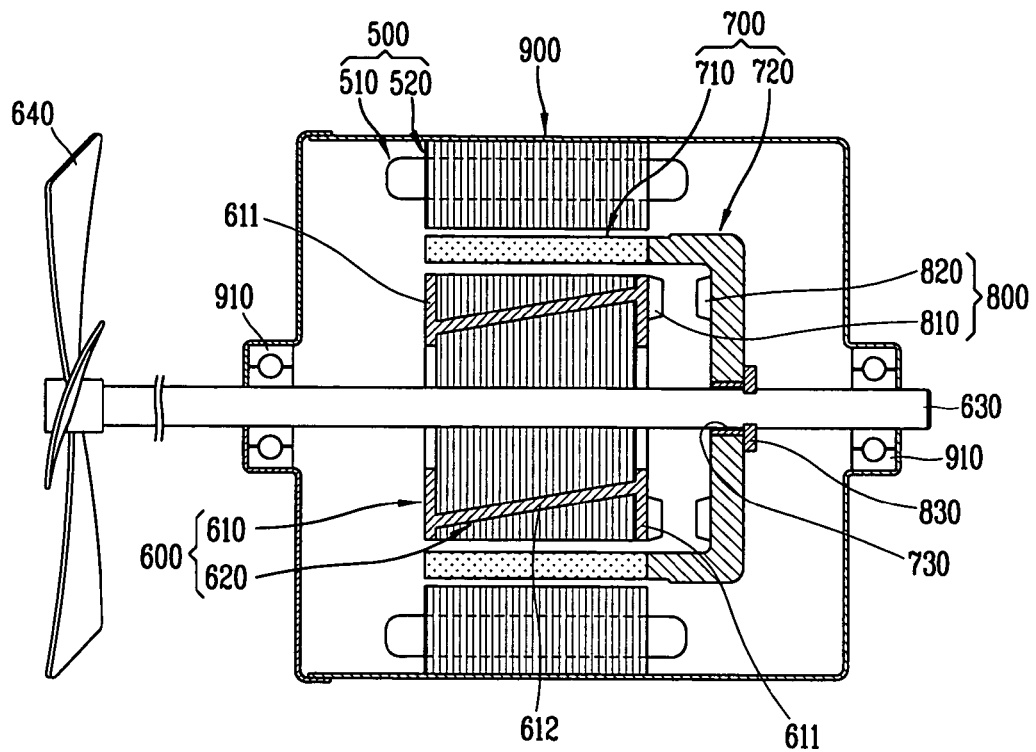
FIG. 3 is a front sectional view that illustrates an induction motor having a reverse-rotation preventing function in accordance with a first embodiment of the present invention.

FIG. 3 is a front sectional view that illustrates an induction motor having a reverse-rotation preventing function in accordance with a first embodiment of the present invention.

As illustrated, the induction motor having a reverse-rotation preventing function includes a stator 500 provided with a winding coil 510 generating flux by a current, an induction rotor 600 provided with a cage 610 and rotatably inserted in the stator 500, wherein a rotary shaft is coupled to its inside, a synchronous rotor 700 provided with a permanent magnet 710 and rotatably coupled to an air gap between the stator 500 and the induction rotor 600, an induction-force generating unit generating a force moving the synchronous rotor 700 in an axial direction, and a rotation preventing unit 800 preventing a reverse rotation by fixing the synchronous rotor 700 moved by the induction-force generating unit when the synchronous rotor 700 rotates in a reverse direction.

The stator 500 includes a stator core 520 formed to have a certain length, and a plurality of winding coils 510 wound in the stator core 520. The winding coils 510 are formed such that a coil is wound around teeth provided inside the stator core 520.

The induction rotor 600 includes a rotor core 620 having a cylindrical bar shape with a certain length and outer diameter and a cage 610 inserted in the rotor core 620. A rotary shaft 630 is coupled to the center of the rotor core 620, and a fan 650, which is one example of a load coupled to the rotary shaft 630, is coupled to the rotary shaft 630. The rotor core 620 is a lamination body formed by lamination of a plurality of sheets.

The cage 610 is a conductor, and is formed at the rotor core 620 by insert-molding. Preferably, the cage 610 is made of aluminum.

The induction rotor 600 is rotatably inserted in an insertion hole formed inside the stator 500.

The synchronous rotor 700 includes a permanent magnet 710 formed in a hollow cylindrical type with a certain thickness, and a holder 720 formed as a cup shape and supporting the permanent magnet 710. The permanent magnet 710 is rotatably inserted in the air gap between the stator 500 and the induction rotor 600, a bearing 730 is coupled to one side of the holder 720, and the bearing 730 is coupled to the rotary shaft 630. Preferably, the bearing 730 coupled to the synchronous rotor 700 is a bush bearing which can move in an axial direction.

The stator 500 is mounted inside a motor casing 900, bearings 910 are provided to both sides of the motor casing 900, respectively, and the rotary shaft 630 is coupled to the bearings 910.

The induction-force generating unit allows a current induced to the cage 610 of the induction rotor 600 to flow, inclined with respect to a direction of a rotation axis of the induction rotor 600. Such an induction generating unit is implemented by the cage 610 provided with a plurality of inclined connection bar portions 612.

Figure 4:
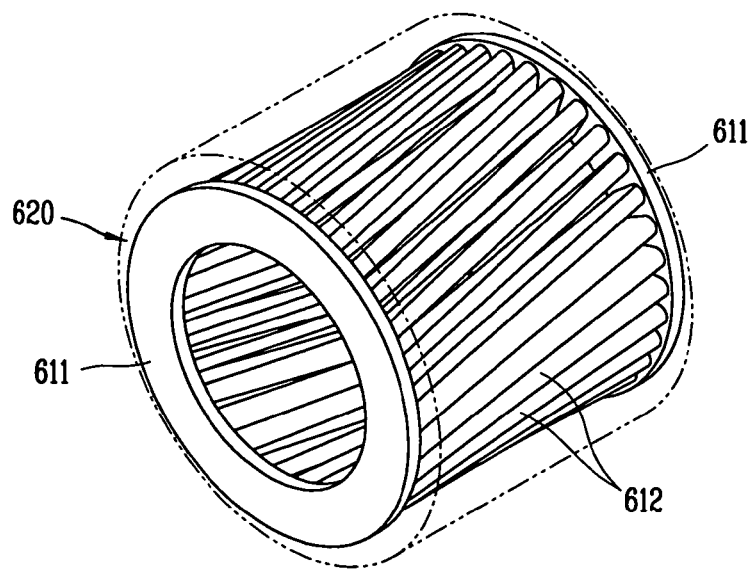
FIG. 4 is a perspective view that illustrates a cage constituting an induction motor having a reverse-rotation preventing function in accordance with the present invention.

Namely, as shown in FIG. 4, the cage 610 includes annular end ring portions 611 placed at both sides of the rotor core 620, respectively, and inclined connection bar portions 612 placed inside the rotor core 620 and connected between the two end ring portions 610 to be inclined with respect to a center line of the two end ring portions 611. The plurality of inclined connection bar portions 612 are arranged to be inclined such that on the basis of a center line of the two end ring portions 611 having the same center line, the right portion is placed above the central line and the left portion is placed below the central line in a state that the cage 610 is horizontally placed. When flowing to the cage 610, an induction current flows along the inclined connection bar portions 612 of the cage 610, inclined with respect to the rotation axis.

When the synchronous rotor 700 rotates in a reverse direction, the rotation preventing unit 800 allows the synchronous rotor 700 moved by the induction-force generating unit to integrally engage with the induction rotor 600, thereby increasing load inertia of the synchronous rotor 700 and thusly preventing the rotation of the synchronous rotor 700.

Figure 5:
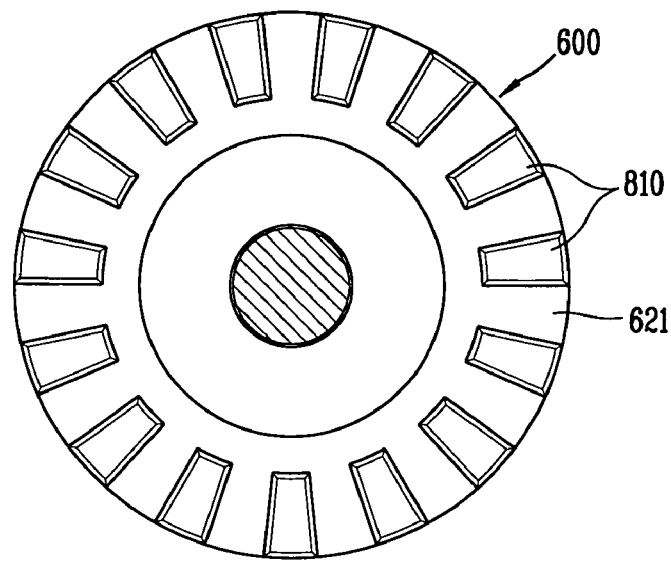
FIGS. 5 and 6 are side sectional views that illustrate a rotation preventing unit constituting the induction motor having the reverse-rotation preventing function.
Figure 6:
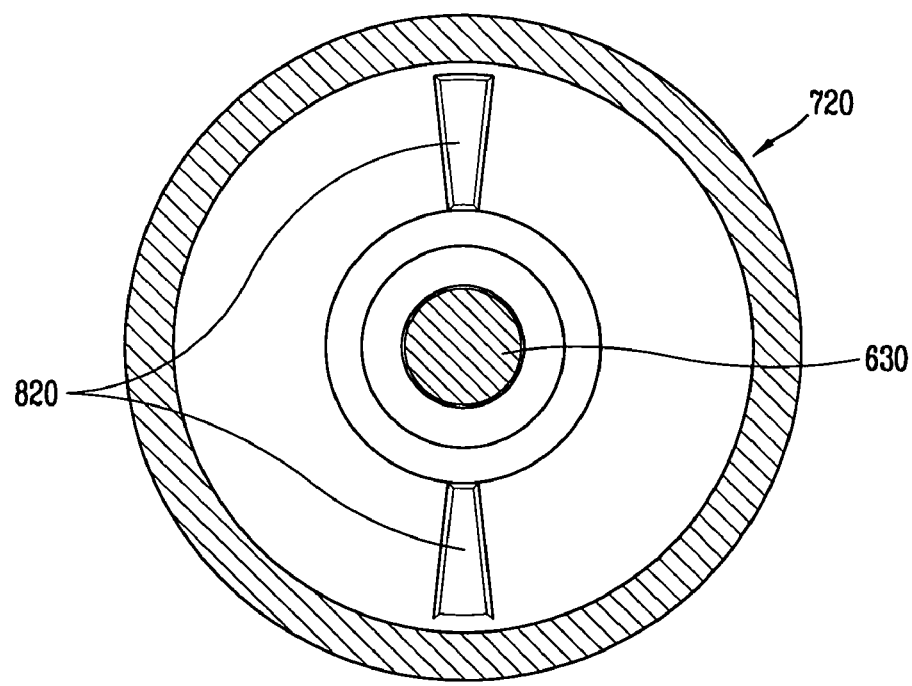

As shown in FIGS. 5 and 6, the rotation preventing unit 800 includes stopping protrusions 810 that are protrudingly formed at one surface of the induction rotor 600 at regular intervals, and stopping projections 820 that are formed at one surface of the synchronous rotor 700 which faces the surface of the induction rotor 600 on which the stopping protrusions 810 are formed, and engage with the stopping protrusions 810 when the synchronous rotor 700 reversely rotates. Preferably, the stopping protrusions 810 are formed at the end ring portion 611 of the cage 610 constituting the induction rotor 600. Also, preferably, the stopping projections 820 are formed at an inner surface of the holder 720 constituting the synchronous rotor 700.

Preferably, the stopping protrusions 810 formed at the induction rotor 600 are arranged in a ring shape.

A stopper 830 for maintaining a set position of the synchronous rotor 700 at the time of forward rotation of the synchronous rotor 700 is provided at the rotary shaft 630. The stopper 830 is formed as a ring shape with a certain thickness, and is coupled to the rotary shaft 630 so as to be placed outside the holder 720 of the synchronous rotor 700. Preferably, contact surfaces of the holder 720 of the synchronous rotor 700 and the stopper 830 are preferably formed as bearing surfaces.

Figure 7:
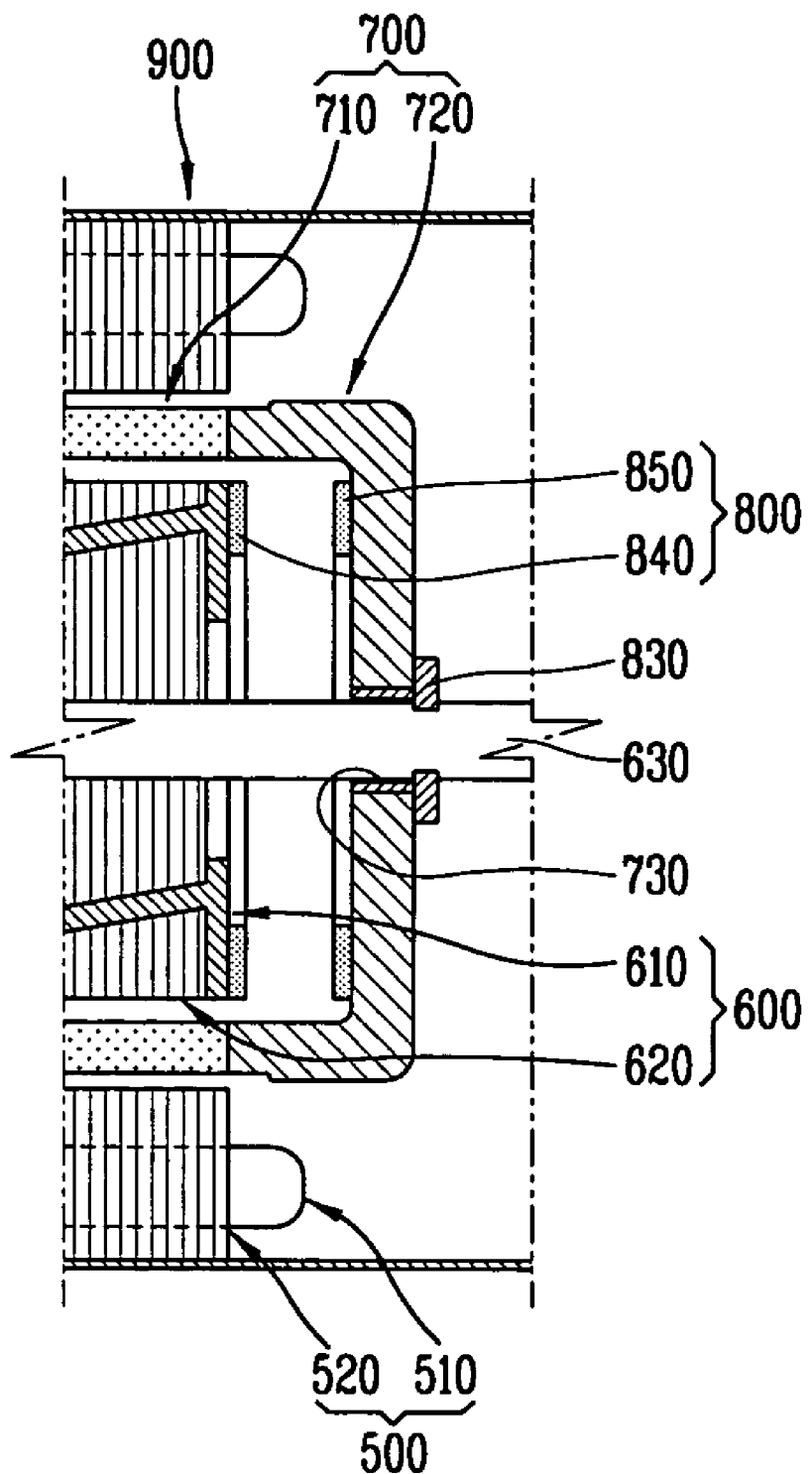
FIG. 7 is a front view that illustrates a different embodiment of the rotation preventing unit constituting the induction motor having the reverse-rotation preventing function.

As shown in FIG. 7, in a different embodiment of the rotation preventing unit, the rotation preventing unit 800 includes a first friction member 840 attached to one surface of the induction rotor 600, and a second friction member 850 attached to one surface of the synchronous rotor 700 facing the surface of the induction rotor 600 where the first friction member 840 is placed, for coming in contact with the first friction member 840 when the synchronous rotor 700 rotates in a reverse direction.

The first friction member 840 and the second friction member 850 are formed in a ring shape with a certain thickness, and are preferably formed of a rubber material.

The operation of the induction motor having such a reverse-rotation preventing function in accordance with the first embodiment of the present invention will now be described.

In the induction motor having the reverse-rotation preventing function, power is applied to the stator 500, a rotating magnetic field is formed by power applied to the stator 500, and the synchronous rotor 700 provided with the permanent magnet 710 makes a relative rotation with respect to the rotary shaft 630, corresponding to the rotating magnetic field. Simultaneously with the rotation of the synchronous rotor 700, an induction current flows to the cage 610 of the induction rotor 600 by flux of the permanent magnet 710 constituting the synchronous rotor 700. The induction rotor 600 is rotated under the influence of the rotating magnetic field of the stator 600, the permanent magnet 710 of the synchronous rotor 700 and the induction current induced to the induction rotor 600.

Figure 8:
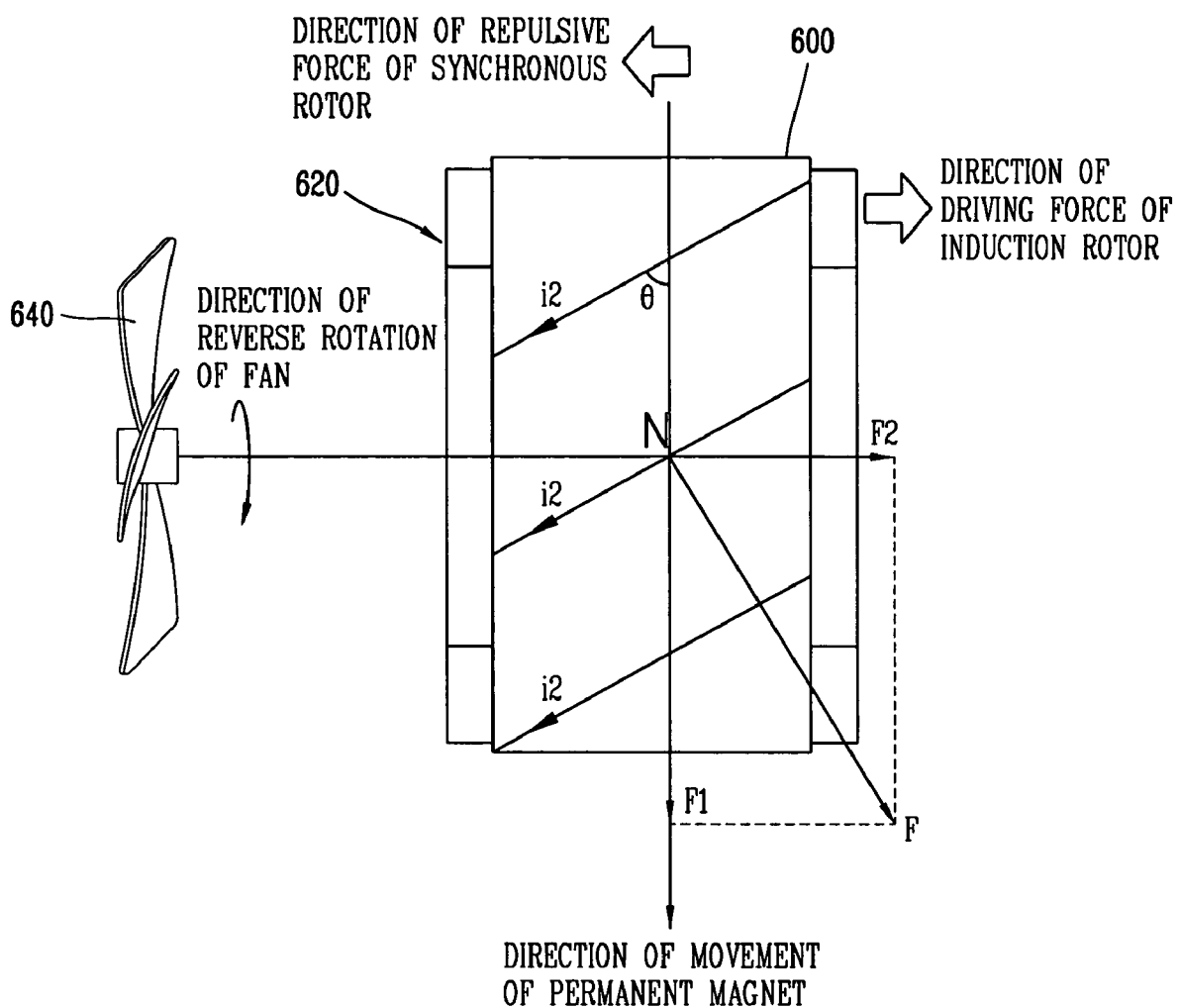
FIG. 8 is a front view that illustrates a force applied to an induction rotor of the induction motor having the reverse-rotation preventing function in accordance with the present invention.
Figure 9:
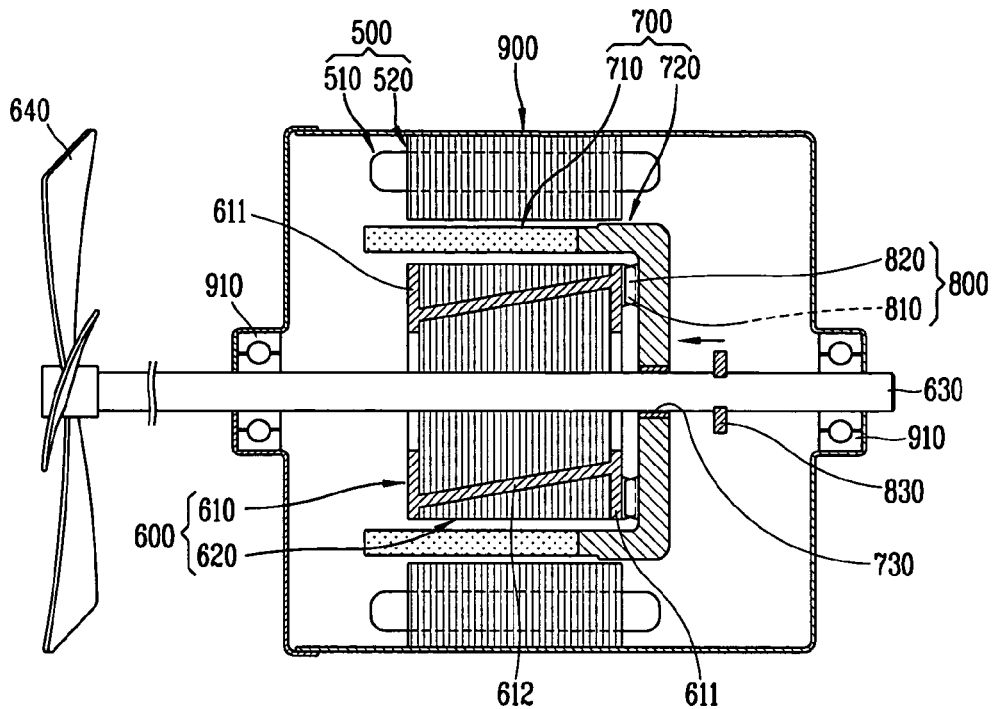
FIG. 9 is a front view that illustrates an operational state of the induction motor having the reverse-rotation preventing function in accordance with the present invention.

A reverse rotation force is generated at the synchronous rotor due to a phase of the initially-applied voltage or an unparallel rotating magnetic field at the time of initial driving of the motor, namely, and simultaneously, the synchronous rotor 700 is moved toward the induction rotor 600 by an induction current applied to the induction rotor 600. To more specially explain such processes, as shown in FIG. 8, an axial-direction force is applied to the induction rotor 600 in a direction opposite to the fan (to the right side on the drawing) by the current induced to the inclined connection bar portions 612 of the cage 610 of the induction rotor 600 and the flux of the synchronous rotor 700, and a repulsive force is applied to the permanent magnet 710 of the synchronous rotor 700, corresponding to the axial-direction force, so that the synchronous rotor 700 is moved toward the induction rotor 600 (to the left side on the drawing). As the synchronous rotor 700 is moved toward the induction rotor 600, as shown in FIG. 9, the stopping protrusions 810 of the induction rotor and the stopping projections 820 of the synchronous rotor, which constitute the rotation preventing unit 800 engage with each other. By the engagement between the stopping protrusions 810 of the induction rotor 600 and the stopping projections 820 of the synchronous rotor 700, the fan 640, the rotary shaft 630, the induction rotor 600 and the synchronous rotor 700 becomes one body. As the synchronous rotor 700 becomes integral with other components, load inertia (mass inertia) becomes very great, so that the reverse rotation of the synchronous rotor 700 can be prevented.

Also, if the phase of the initially-applied voltage is changed or the unparallel rotating magnetic field is resolved at the time of initial driving of the motor, a direction of a current induced to the inclined connection bar portions 612 of the induction rotor cage 610 is changed, and thusly a direction of a force applied to the permanent magnet 710 of the synchronous rotor 700 is changed to an opposite direction such that the synchronous rotor 700 is moved to the opposite side of the induction rotor 600 (to the right side on the drawing). Accordingly, the stopping protrusions 810 of the induction rotor 600 and the stopping projections 820 of the synchronous rotor 700 that engage with each other are released, and thusly, the synchronous rotor 700 rotates in a forward direction. Here, the movement of the synchronous rotor 700 is limited by a stopper 830 coupled to the rotary shaft 630.

Together with the forward rotation of the synchronous rotor 700, the induction rotor 600 also rotates in a forward direction, and by the forward rotation of the induction rotor 600, the rotary shaft 630 and the fan 640 coupled to the rotary shaft 630 are rotated in a set forward direction.

If the rotation preventing unit 80 includes the first friction member 840 and the second friction member 850, the synchronous rotor 700 and the induction rotor 600 becomes one body by a friction force between the first friction member 840 and the second friction member 850.

In the first embodiment of the induction motor having a reverse-rotation preventing function according to the present invention, when a reverse-rotation force is applied to the induction rotor 600 due to a phase of a voltage which is initially applied or an unparallel rotating magnetic force at the time of initial driving of the motor, the synchronous rotor 700 is integrally coupled to the induction rotor 600, thereby increasing load inertia and thusly preventing a reverse rotation.

Also, only a small number of components are required for the rotation preventing unit and its structure becomes simple because the components for preventing the reverse rotation occurring when a reverse-rotation force is applied to the induction rotor 600 due to a phase of a voltage initially applied at the time of initial driving of the motor or due to an unparallel rotating magnetic force are the cage 610, the plurality of stopping protrusions 810 and stopping projections 820, and the like.

Figure 10:
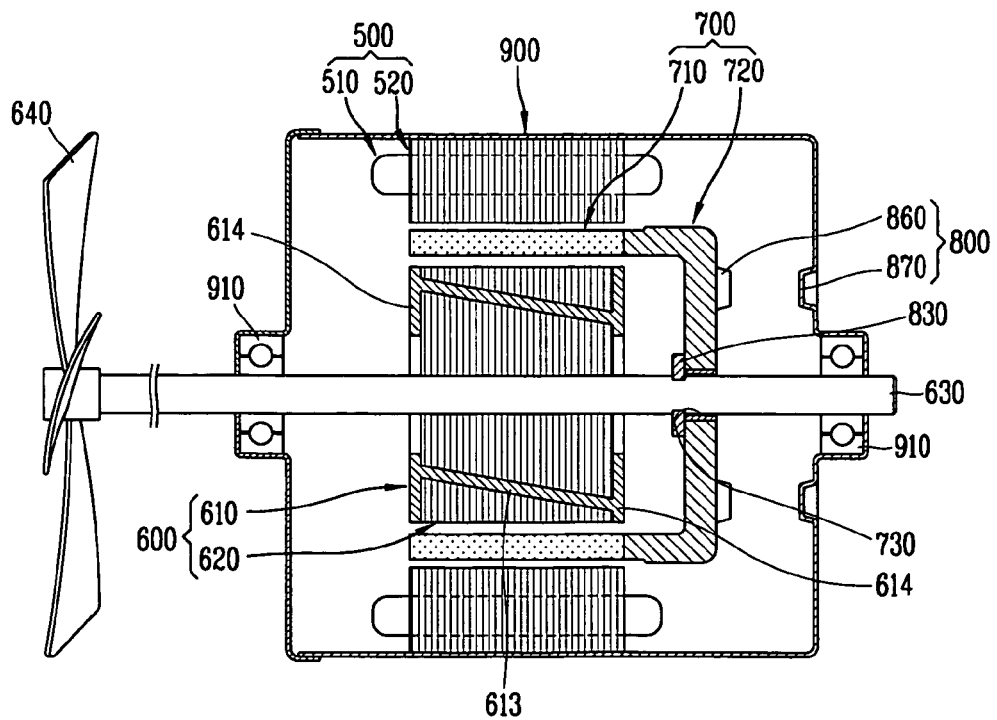
FIG. 10 is a front view that illustrates an induction motor having a reverse-rotation preventing function in accordance with a second embodiment of the present invention.

FIG. 10 is a sectional view that illustrates an induction motor having a reverse-rotation preventing function in accordance with a second embodiment of the present invention. Parts which are the same as those described in the first embodiment are designated by the same reference numerals.

As illustrated, the induction motor having the reverse-rotation preventing function includes a stator 500 having a winding coil that generates flux by a current, an induction rotor 600 provided with a cage 610 and rotatably inserted in the stator 500, wherein a rotary shaft is coupled therein, a synchronous rotor 700 provided with a permanent magnet 710 and rotatably coupled between the stator 500 and the induction rotor 600, an induction-force generating unit generating a force for moving the synchronous rotor 700 in an axial direction, and a rotation preventing unit 800 preventing a reverse rotation by fixing the synchronous rotor 700 moved by the induction-force generating unit when the synchronous rotor 700 reversely rotates.

Every construction is identical to that of the first embodiment except for the induction-force generating unit and the rotation preventing unit 800.

The induction-force generating unit is for allowing a current induced to the cage 610 of the induction rotor 600 to flow, inclined with respect to a direction of a rotary axis of the induction rotor 600. The induction-force generating unit is implemented such that inclined connection bar portions 613 constituting the cage 610 are arranged in a direction opposite to the direction that the aforedescribed inclined connection bar portions 612 of the first embodiment are arranged.

Namely, the cage 610 includes annular end ring portions 611 placed at both sides of the rotor core 620, respectively, and inclined connection bar portions 613 placed inside the rotor core 620 and connected between the two end ring portions 610 to be inclined with respect to a center line of the two end ring portions 611. The plurality of inclined connection bar portions 613 are arranged to be inclined such that on the basis of a center line of the two end ring portions 611 having the same center line, the right portion is placed below the central line and the left portion is placed above the central line in a state that the cage 610 is horizontally placed.

When the synchronous rotor 700 rotates in a reverse direction, the rotation preventing unit 800 allows the synchronous rotor 700 moved by the induction-force generating unit to integrally engage with a motor casing 900, thereby increasingly load inertia of the synchronous rotor 700. Thusly, the rotation of the synchronous rotor 700 is prevented.

Such a rotation preventing unit 800 includes stopping protrusions 860 protrudingly formed at one surface of the synchronous rotor 700 at regular intervals, and stopping projections 870 formed at one surface of the motor casing 900 encompassing the induction motor, for engaging with the stopping protrusions 860 when the synchronous rotor 700 reversely rotates. The stopping protrusions 860 are formed at one surface of the holder 720 of the synchronous rotor 700, and the stopping projections 870 are formed at an inner surface of one side of the motor casing 900 which faces the surface of the holder 720 where the stopping protrusions 850 are formed.

Preferably, the stopping protrusions 860 formed at the induction rotor 600 are arranged in a ring shape.

A stopper for maintaining a set position of the synchronous rotor 700 at the time of forward rotation of the synchronous rotor 700 is provided at the rotary shaft 630. The stopper 830 has an annular shape with a certain thickness, and is coupled to the rotary shaft 630 to be placed between one surface of the induction rotor 600 and the inner surface of the holder 720 of the synchronous rotor 700. Preferably, contact surfaces of the holder 720 of the synchronous rotor 700 and the stopper 830 are respectively formed as bearing surfaces.

Figure 11:
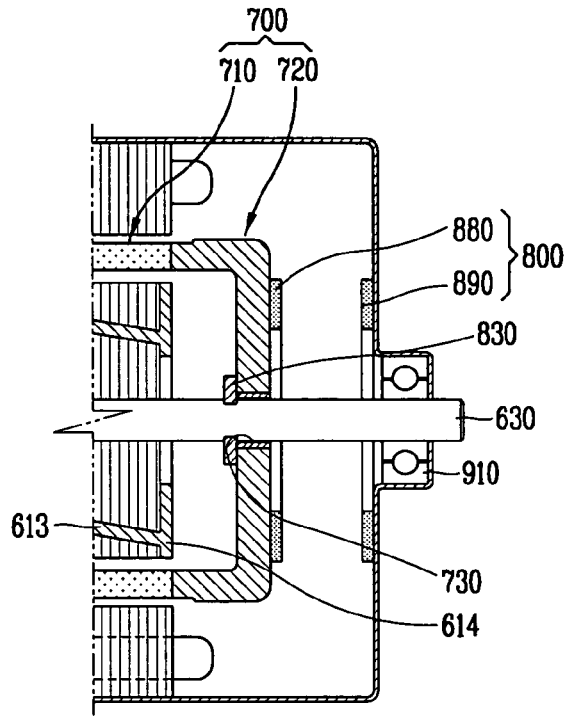
FIG. 11 is a side sectional view that illustrates a different embodiment of a rotation preventing unit constituting the induction motor having the reverse-rotation preventing function in accordance with the second embodiment of the present invention.

As shown in FIG. 11, in a different embodiment of the rotation preventing unit, the rotation preventing unit 800 includes a first friction member 880 attached to an outer surface of the holder 720 of the synchronous rotor 700, and a second friction member 890 attached to an inner surface of the motor casing 900 facing an outer surface of the holder 720 of the synchronous rotor 700 where the first friction member 880 is placed, for coming in contact with the friction member 880 at the time of reverse rotation of the synchronous rotor 700.

The first friction member 880 and the second friction member 890 are formed as a ring shape with a certain thickness, and are preferably formed of a rubber material.

The operation of the induction motor having the reverse-rotation preventing function in accordance with the second embodiment of the present invention will now be described.

A reverse-rotation force is generated at the synchronous rotor 700 due to a phase of a voltage initially applied or an unparallel rotating magnetic force at the time of initial driving of the motor, and simultaneously, the synchronous rotor 700 is moved to a direction opposite to the induction rotor 600 by the induction current applied to the induction rotor 600.

Figure 12:
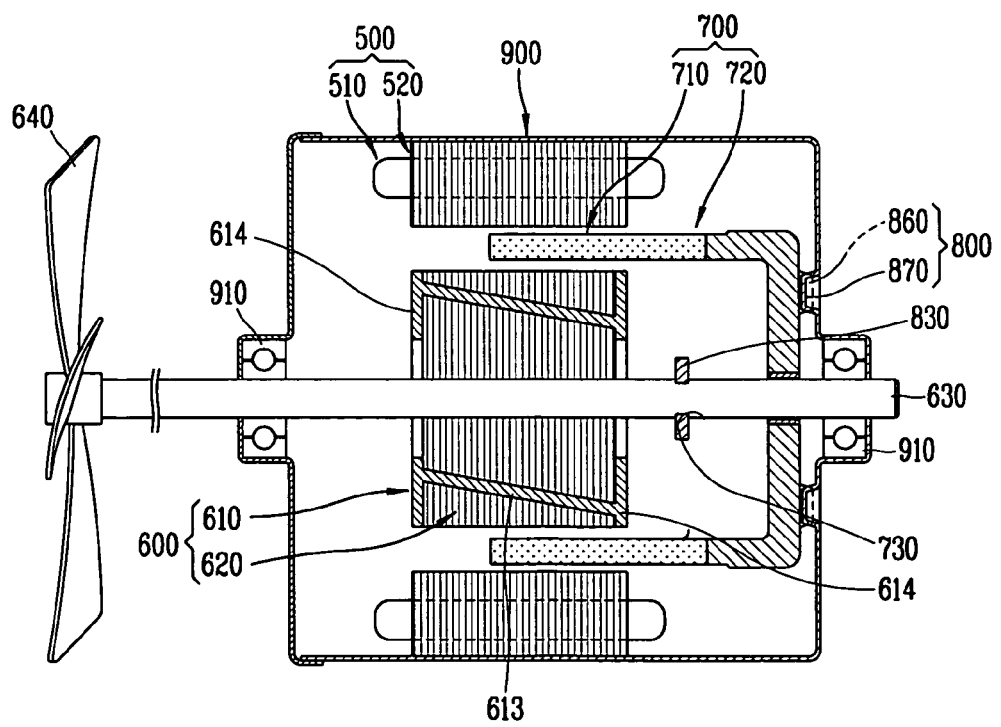
FIG. 12 is a front view that illustrates an operational state of the induction motor having the reverse-rotation preventing function in accordance with the second embodiment of the present invention.

Namely, because the direction of the inclined connection bar portions 613 of the cage 610 constituting the induction rotor 600 is opposite to the direction of the inclined connection bar portions 612 of the first embodiment, a force applied to the synchronous rotor 700 is opposite to that of the first embodiment. As the synchronous rotor 700 is moved to the opposite side of the induction rotor 600, as shown in FIG. 12, the stopping protrusions 860 of the synchronous rotor constituting the rotation preventing unit 800 are engaged with the stopping projections 870 of the motor casing. By the engagement between the stopping protrusions 860 of the synchronous rotor 700 and the stopping projections 870 of the motor casing 900, the synchronous rotor 700 becomes one body with the motor casing 900, thereby greatly increasing load inertia (mass inertial). Accordingly, the reverse rotation of the synchronous rotor 700 is prevented.

Also, if the phase of the initially-applied is changed or the unparallel rotating magnetic field is resolved voltage at the time of initial driving of the motor, a direction of a current induced to the inclined connection bar portions 613 of the induction rotor cage 610 is changed, and thusly, a direction of a force applied to the permanent magnet 710 of the synchronous rotor 700 is changed to an opposite direction such that the synchronous rotor 700 is moved toward the induction rotor 600 (to the left side on the drawing). Accordingly, the engagement between the stopping protrusions 860 of the synchronous rotor 700 and the stopping projections 870 of the motor casing 900 is released, and thusly, the synchronous rotor 700 makes a forward rotation. Here, the movement of the synchronous rotor 700 is limited by the stopper 830 coupled to the rotary shaft 630.

Together with the forward rotation of the synchronous rotor 700, the induction rotor 600 also makes a forward rotation, and by the forward rotation of the induction rotor 600, the rotary shaft 630 and the fan 640 coupled to the rotary shaft 630 are rotated in a set forward direction.

If the rotation preventing unit 800 includes the first friction member 880 and the second friction member 890, the synchronous rotor 700 and the motor casing 900 becomes one body by a frictional force between the first friction member 880 and the second friction member 890.

In the second embodiment of the induction motor having a reverse-rotation preventing function according to the present invention, when a reverse-rotation force is applied to the induction rotor 600 due to a phase of a voltage which is initially applied or an unparallel rotating magnetic force at the time of initial driving of the motor, the synchronous rotor 700 is integrally coupled to the induction rotor 600, thereby increasing load inertia and thusly preventing a reverse rotation.

Also, only a small number of components are required for the rotation preventing unit and its structure becomes simple because components for preventing the reverse rotation occurring when a reverse-rotation force is applied to the induction rotor 600 due to a phase of a voltage applied at the time of initial driving of the motor or due to an unparallel rotating magnetic force are the cage 610, the plurality of stopping protrusions 810 and stopping projections 820, and the like.

Also, as another embodiment of the present invention, the induction-force generating unit may be formed such that inclined connection bar portions are not inclined but parallel to a rotation axis, and poles of the permanent magnet constituting the synchronous rotor is arranged to be inclined.

As described so far, the induction rotor having the reverse rotation preventing function according to the present invention is advantageous in that when a reverse rotation force is applied to the induce rotor due to a phase of a voltage which is initially applied or an unparallel rotating magnetic field at the time of initial driving of the motor and thusly a reverse rotation occurs, load inertia of the synchronous rotor is increased, and the reverse rotation of the synchronous rotor and the induction rotor is prevented. Accordingly, reliability of the induction motor can be improved.

Also, the construction for preventing the reverse rotation of the induction motor is simple, and a small number of components are required, which facilitates manufacturing and also lowers a manufacturing cost. Accordingly, price competitiveness of a product can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An induction motor having a reverse-rotation preventing function, comprising:
   a stator provided with a winding coil generating flux by a current;
   an induction rotor provided with a cage and rotatably inserted in the stator, wherein a rotary shaft is coupled to the inside of the rotor;
   a synchronous rotor provided with a permanent magnet and rotatably coupled between the stator and the induction rotor;
   an induction-force generating unit generating a force for moving the synchronous rotor in an axial direction; and
   a rotation preventing unit preventing a reverse rotation by fixing the synchronous rotor moved by the induction-force generating unit at the time of reverse rotation of the synchronous rotor.

2. The induction motor of claim 1, wherein the induction-force generating unit allows a current induced in the cage of the induction rotor to flow in an inclined direction, with respect to a direction of a rotation axis of the induction rotor.

3. The induction motor of claim 1, wherein the induction-force generating unit is formed such that poles of the permanent magnet are arranged to be inclined with respect to a rotation axis of the induction rotor.

4. The induction motor of claim 1, wherein the induction-force generating unit includes a cage of the induction rotor where an induction current is generated, wherein the cage includes two end ring portions having an annular shape, and a plurality of inclined connection bar portions connecting the two end ring portions and placed to be inclined with respect to a center line of the end ring portions.

5. The induction motor of claim 4, wherein each inclined connection bar portion of the cage is arranged such that, on the basis of the center line of the two end ring portions, its right portion is placed above the center line and the left portion is placed below the center line in a state that the cage is placed horizontally.

6. The induction motor of claim 4, wherein each inclined connection bar portion of the cage is arranged such that, on the basis of the center line of the two end ring portions, its right portion is placed below the center line and the left portion is placed above the center line in a state that the cage is placed horizontally.

7. The induction motor of claim 1, wherein a stopper for maintaining a set position of the synchronous rotor at the time of forward rotation of the synchronous rotor is provided at the rotary shaft.

8. The induction motor of claim 1, wherein when the synchronous rotor rotates in a reverse direction, the rotation preventing unit allows the synchronous rotor moved by the induction-force generating unit to integrally engage the induction rotor, thereby increasing load inertia of the synchronous rotor and thus preventing the rotation of the synchronous rotor.

9. The induction motor of claim 1, wherein when the synchronous rotor rotates in a reverse direction, the rotation preventing unit allows the synchronous rotor moved by the induction-force generating unit to integrally engage a motor casing encompassing the induction motor, thereby increasing load inertia of the synchronous rotor and thus preventing rotation of the synchronous rotor.

10. The induction motor of claim 8, wherein the rotation preventing unit includes stopping protrusions that are protrudingly formed at one surface of the induction rotor at regular intervals, and stopping projections that are formed at one surface of the synchronous rotor facing the surface of the induction rotor where the stopping protrusions are formed, and engaging the stopping protrusions when the synchronous rotor reversely rotates.

11. The induction motor of claim 10, wherein the stopping protrusions are arranged in a ring shape.

12. The induction motor of claim 10, wherein the stopping protrusions are formed at the end ring portion of the cage of the induction rotor.

13. The induction motor of claim 8, wherein the rotation preventing unit includes a first friction member attached to one surface of the induction rotor, and a second friction member attached to one surface of the synchronous rotor facing the surface of the induction rotor where the first friction member is placed, and coming in contact with the first friction member when the synchronous rotor makes a reverse rotation.

14. The induction motor of claim 13, wherein the first friction member and the second friction member are formed of a rubber material.

15. The induction motor of claim 13, wherein the first friction member and the second friction member are formed in a ring shape with a certain thickness.

16. The induction motor of claim 9, wherein the rotation preventing unit includes stopping protrusions protrudingly formed at one surface of the synchronous rotor at regular intervals, and stopping projections formed at one surface of the motor casing encompassing the induction rotor, and engaging the stopping protrusions when the synchronous rotor rotates in a reverse direction.

17. The induction motor of claim 16, wherein the stopping protrusions are arranged in a ring shape.

18. The induction motor of claim 9, wherein the rotation preventing unit includes a first friction member attached to one surface of the synchronous rotor, and a second friction member attached to one surface of the motor casing encompassing the induction motor and coming in contact with the first friction member when the synchronous rotor rotates in a reverse direction.

19. The induction motor of claim 18, wherein the first friction member and the second friction member are formed of a rubber material.

20. The induction motor of claim 18, wherein the first friction member and the second friction member are formed as a ring shape with a certain thickness.

* * * * *